United States Patent
Seo et al.

(10) Patent No.: US 8,577,284 B2
(45) Date of Patent: Nov. 5, 2013

(54) COOPERATIVE RECEPTION DIVERSITY APPARATUS AND METHOD BASED ON SIGNAL POINT REARRANGEMENT OR SUPERPOSITION MODULATION IN RELAY SYSTEM

(75) Inventors: Bangwon Seo, Daejeon (KR); Heesoo Lee, Daejeon (KR); Jae Young Ahn, Daejeon (KR); Chung Gu Kang, Daejeon (KR); Hyun Seok Ryu, Daejeon (KR); Sun Mi Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 454 days.

(21) Appl. No.: 12/921,905

(22) PCT Filed: Dec. 31, 2008

(86) PCT No.: PCT/KR2008/007861
§ 371 (c)(1),
(2), (4) Date: Sep. 10, 2010

(87) PCT Pub. No.: WO2009/113763
PCT Pub. Date: Sep. 17, 2009

(65) Prior Publication Data
US 2011/0014865 A1 Jan. 20, 2011

(30) Foreign Application Priority Data

Mar. 11, 2008 (KR) .................. 10-2008-0022504
May 6, 2008 (KR) .................. 10-2008-0041977
Sep. 25, 2008 (KR) .................. 10-2008-0094077

(51) Int. Cl.
*H04B 7/15* (2006.01)
*H04B 3/36* (2006.01)
*H04B 7/14* (2006.01)

(52) U.S. Cl.
USPC .................. 455/11.1; 455/7; 455/16; 455/9

(58) Field of Classification Search
USPC .................. 455/11.1, 9, 16, 550.1
See application file for complete search history.

(56) References Cited

U.S. PATENT DOCUMENTS

| 2004/0100928 A1 | 5/2004 | Ben-David et al. |
| 2005/0068918 A1 | 3/2005 | Mantravadi et al. |

(Continued)

FOREIGN PATENT DOCUMENTS

| KR | 10-0809604 B1 | 2/2008 |
| WO | 2007/089110 A2 | 8/2007 |
| WO | 2007/133051 A2 | 11/2007 |

OTHER PUBLICATIONS

International Search Report and Written Opinion for Application No. PCT/KR2008/007861, dated May 28, 2009.

*Primary Examiner* — Tilahun B Gesesse
(74) *Attorney, Agent, or Firm* — Nelson Mullins Riley & Scarborough LLP

(57) ABSTRACT

A method and apparatus for method for providing cooperative reception diversity based on signal point rearrangement and superposition modulation performed at a relay station is discussed. A first technique performs superposition modulation at a relay station and a second technique employs signal point rearrangement at a relay station. The superposition modulation is a different type of superposition modulation than that employed by the transmitter of the signal. Similarly, the signal point rearrangement is a different type of signal point rearrangement than that employed by the transmitter of the signal. As a result of the superposition modulation or signal point rearrangement performed by the relay station, the reliability of a signal received by a reception unit at the destination receiver is improved.

10 Claims, 7 Drawing Sheets

(56) References Cited

U.S. PATENT DOCUMENTS

| | | |
|---|---|---|
| 2007/0195907 A1 | 8/2007 | Wang et al. |
| 2007/0223374 A1* | 9/2007 | Popovski et al. ............ 370/230 |
| 2008/0232510 A1* | 9/2008 | Golitschek Edler Von Elbwart et al. ............................ 375/298 |
| 2009/0135926 A1* | 5/2009 | Tsouri et al. .................. 375/260 |

* cited by examiner

COOPERATIVE RECEPTION DIVERSITY APPARATUS AND METHOD BASED ON SIGNAL POINT REARRANGEMENT OR SUPERPOSITION MODULATION IN RELAY SYSTEM

RELATED APPLICATIONS

This application is a 35 U.S.C. §371 national stage filing of PCT Application No. PCT/KR2008/007861 filed on Dec. 31, 2008, which claims priority to, and the benefit of, Korean Patent Application No. 10-2008-0022504 filed on Mar. 11, 2008, Korean Patent Application No. 10-2008-0041977 filed on May 6, 2008 and Korean Patent Application No. 10- 2008-0094077 filed on Sep. 25, 2008. The contents of the aforementioned applications are hereby incorporated by reference.

TECHNICAL FIELD

The present invention relates to an apparatus and method for cooperative reception diversity based on signal point rearrangement or superposition modulation in a relay system, particularly, to an apparatus and method for cooperative reception diversity based on signal point rearrangement or superposition modulation in a relay system that improves reliability of a received signal in a reception unit that uses a cooperative reception diversity method wherein a relay unit of the relay system performs signal point rearrangement or superposition modulation of a symbol received from a transmitting unit and transmits the modulated symbol to the reception unit.

This work was supported by the IT R&D program of MIC/IITA [2006-S-001-03].

BACKGROUND ART

A relay system is for smoothly performing communication in a shadow area and to enlarge a cell-coverage capable of providing a service. Particularly, the relay system seeks improvement of communication between a transmitting unit and reception unit. According to a cooperative reception diversity method in the relay system, when a transmitting unit transmits a symbol to a relay unit, a reception unit may overhear the signal and the reception unit may combine the overheard signal with a signal transmitted from the relay station, and thereby can obtain a diversity gain.

The diversity gain which the reception unit in the relay system can obtain may be affected by both channel conditions between the transmitting unit and reception unit, and channel conditions between the relay station and reception unit. A reception reliability of each bit composed of a signal point is affected by a distance between signal points. However, a relay station in a general relay system intactly outputs a received signal as is to a reception unit without converting a signal point of the received signal. Accordingly, the reception unit using the cooperative reception diversity method may receive, from both the transmitting unit and relay station, a signal mapped with a signal point wherein an error occurs in the same bit.

DISCLOSURE OF INVENTION

Technical Problem

An aspect of the present invention provides an apparatus and method for cooperative reception diversity based on signal point rearrangement or superposition modulation in a relay system.

Another aspect of the present invention also provides an apparatus and method for cooperative reception diversity based on signal point rearrangement in a relay system where a relay unit of the relay system performs signal point rearrangement of a symbol received from a transmitting unit and transmits the modulated symbol to the reception unit, and thereby can improve reliability of a received signal in a reception unit.

Another aspect of the present invention also provides an apparatus and method for cooperative reception diversity based on superposition modulation in a relay system where a relay unit of the relay system performs different superposition modulation of a symbol received from a transmitting unit and transmits the modulated symbol to the reception unit, and thereby can improve reliability of a received signal in a reception unit.

Technical Solution

According to an aspect of the present invention, there is provided a method for cooperative reception diversity based on superposition modulation in a relay station, the method including: receiving a superposition-modulated symbol from a transmitting unit, demodulating the received symbol and decoding the demodulated symbol, and modulating the received symbol using superposition modulation different from the superposition modulation used in the transmitting unit, and relaying the modulated message bit to a reception unit.

According to another aspect of the present invention, there is also provided a method for cooperative reception diversity based on superposition modulation in a reception unit of a relay system, including: calculating a Log-Likelihood Ratio (LLR) of the symbol when a certain superposition-modulated symbol is received from a transmitting unit, calculating an LLR of a symbol modulated using superposition modulation different from the superposition modulation used in the transmitting unit when the symbol modulated using the different superposition modulation is received from a relay station, and summing and combining an LLR of each symbol received through the transmitting unit and relay station.

According to still another aspect of the present invention, there is also provided a method for cooperative reception diversity based on signal point rearrangement in a relay station of a relay system, including: receiving a symbol mapped with a certain signal point constellation from a transmitting unit, demodulating the received symbol and decoding the demodulated symbol, and rearranging the signal point unlike the signal point constellation arranged in the transmitting unit and relaying to a reception unit.

According to yet another aspect of the present invention, there is also provided a method for cooperative reception diversity based on signal point rearrangement in a reception unit of a relay system, including: calculating an LLR of the symbol when a symbol mapped with a certain signal point constellation is received from a transmitting unit, calculating an LLR of a symbol with rearranged signal point when the symbol with the rearranged signal point is received from a relay station, and summing and combining an LLR of each symbol received through the transmitting unit and relay station.

According to further aspect of the present invention, there is also provided a relay station in a relay system for providing cooperative reception diversity, including: a demodulator to demodulate a certain superposition-modulated symbol when the certain superposition-modulated symbol is received from a transmitting unit, a decoder to decode the symbol demodulated through the demodulator, to output a message bit, an encoder to perform channel-encoding of the message bit, and a modulator to modulate the encoded message bit using superposition modulation different from the superposition modulation used in the transmitting unit.

MODE FOR THE INVENTION

Figure 1:
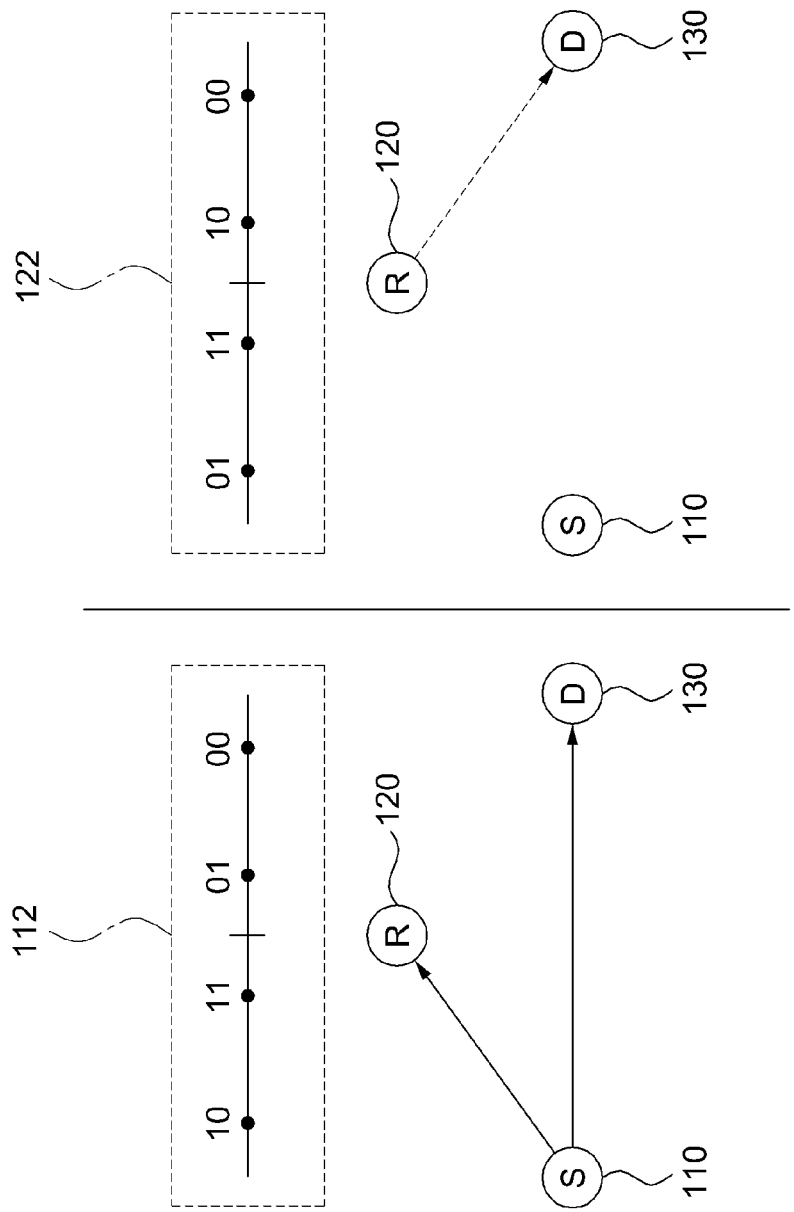
FIG. 1 illustrates an example of signal point rearrangement in a relay system using a cooperative reception diversity method based on signal point rearrangement according to an example embodiment.

Although a few exemplary embodiments of the present invention have been shown and described, the present invention is not limited to the described exemplary embodiments, wherein like reference numerals refer to the like elements throughout.

The present invention relates to an apparatus and method for cooperative reception diversity based on a signal point rearrangement or superposition modulation in a relay system where a relay unit of the relay system performs signal point rearrangement or superposition modulation of a symbol received from a transmitting unit and transmits the modulated symbol to the reception unit, thereby improving reliability of a received signal in a reception unit.

Prior to describing the present invention, for convenience of description, it is assumed that modulation scheme examples use 16-Quadrature Amplitude Modulation (QAM). In the 16-QAM, since an in-phrase (I-axis) and a quadrature-phase (Q-axis) are independent, the 16-QAM may be divided into two 4-Pulse Amplitude Modulation (PAM).

FIG. 1 illustrates an example of signal point rearrangement in a relay system using a cooperative reception diversity method based on signal point rearrangement according to an example embodiment.

First, the relay system using the method for cooperative reception diversity based on signal point rearrangement includes a transmitting unit 110 corresponding to a transmitting node S, relay station 120 corresponding to a relay node R, and reception unit 130 corresponding to a destination node D. In this instance, the relay station 120 may be a relay station used in a cellular system. Also the relation station 120 may be a mobile station that performs a function of a relay station (e.g. a mobile communication terminal, portable terminal, and notebook computer).

The transmitting unit 110 may transmit a received symbol 112 expressed with a 4-PAM signal point constellation as illustrated in FIG. 1 to both the relay station 120 and reception unit 130. The relay station 120 may demodulate and decode the symbol received from the transmitting unit 110. Then, the relay station 120 rearranges the received symbol 112 and transmits the rearranged symbol 122. In other words, a signal point arrangement transmitted from the transmitting unit 110 and a signal point arrangement transmitted from the relay station 120 are different from each other.

The reception unit 130 may receive, from the transmitting unit 110 and relay station 120, signals with different signal point arrangements from each other, and decode the signals using a cooperative reception diversity method. Detailed description of the relay system using the cooperative reception diversity method based on signal point rearrangement will be described later referring to FIG. 3.

Figure 2:
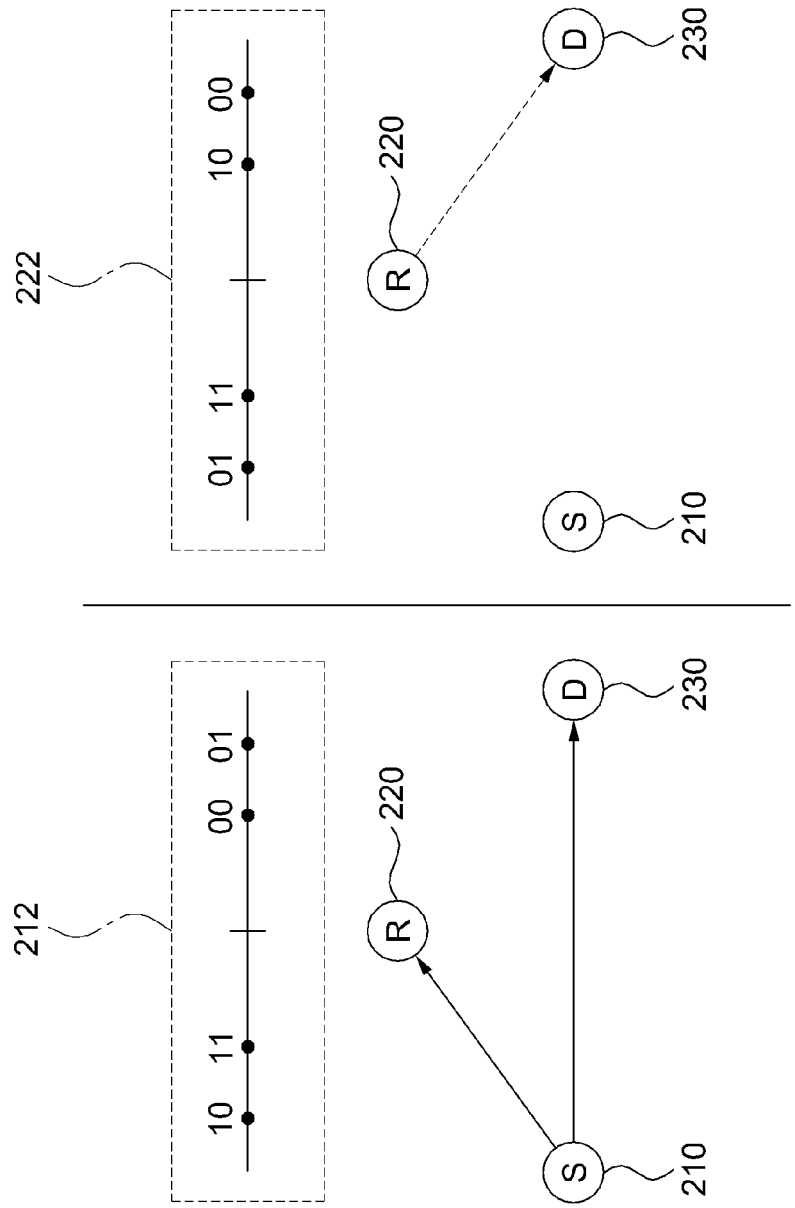
FIG. 2 illustrates an example of superposition modulation in a relay system using a cooperative reception diversity method based on superposition modulation according to an example embodiment.

FIG. 2 illustrates an example of superposition modulation in a relay system using a method for cooperative reception diversity based on superposition modulation according to an example embodiment.

Prior to describing the present invention, for convenience of description, it is assumed that two symbols modulated by a Binary phase Shift Keying (BPSK), the BPSK being a superposition modulation scheme, are superpositioned and one of four signal points transmitted.

First, the relay system using cooperative reception diversity method based on the superposition modulation includes a transmitting unit 210, relay station 220, and reception unit 230 as illustrated in FIG. 1.

The transmitting unit 210 may transmit a superposition-modulated symbol to a relay station 220 and reception unit 230. In this instance, a signal Xs transmitted from the transmitting unit 210 to the relay station 220 and reception unit 230 using the superposition module is formulated in Equation 1 below. In this instance, when the symbol that the transmitting unit 210 superposition-modulates is expressed with the signal point constellation, it is similar to a symbol 212.

$$X_S = \sqrt{1-\alpha}s_1 + \sqrt{\alpha}s_2 \quad \text{[Equation 1]}$$

where $S_1$ and $S_2$ indicate different symbols from each other, and indicates a power division coefficient.

That is, the two different symbols having different power ratios from each other due to the power division coefficient are linearly-combined and transmitted from the transmitting unit.

Then, the relay station 220 may demodulate and decode the symbol received from the transmitting unit 210. Subsequently, the relay station 220 transmits $X_R$ that is rearranged, as given in Equation 2 below, from the symbol that is superposition-modulated according to Equation 1.

$$X_R = \sqrt{1-\alpha}s_2 + \sqrt{\alpha}s_1 \quad \text{[Equation 2]}$$

where the $S_1$ and $S_2$ indicate different symbols from each other, and indicates a power division coefficient.

Upon comparing the Equation 1 and Equation 2, it is recognized that the power ratios assigned to the $S_1$ and $S_2$ are changed. For instance, when it is assumed that α=0.1, as shown in Equation 1, the power ratio assigned to the $S_1$ is greater than that of the $S_2$ of the symbol transmitted from the transmitting unit 210, and thus a distance between signal points of $$\sqrt{1-\alpha}s_1$$

is longer than that of $$\sqrt{\alpha}s_2$$

As shown in FIG. 2, this means that a detection reliability of a symbol composed of the $S_1$ and $S_2$ with respect to a first bit is higher than a detection reliability with respect to a second bit. However, as shown in Equation 2, the power ratio assigned to the $S_2$ is greater than that of the $S_1$ of the symbol transmitted from the relay station 220 after performing signal point rearrangement, and thus a detection reliability of the symbol composed of the $S_1$ and $S_2$ with respect to the second bit is higher than a detection reliability with respect to the first bit.

Next, the reception unit 230 may receive a signal respectively from the transmitting unit 210 and the relay station 220, each respective signal being included in a signal point arrangement arranged using superposition modulation different from each other, and then may decode the signals using a cooperative reception diversity method. Therefore, on the average, detection reliabilities with respect to the first bit and the second bit become equal with each other, thereby improving performance of decoding signal in the reception unit 230. Detailed description of the relay system using the cooperative reception diversity method based on superposition modulation will be described later referring to FIG. 4.

Figure 3:
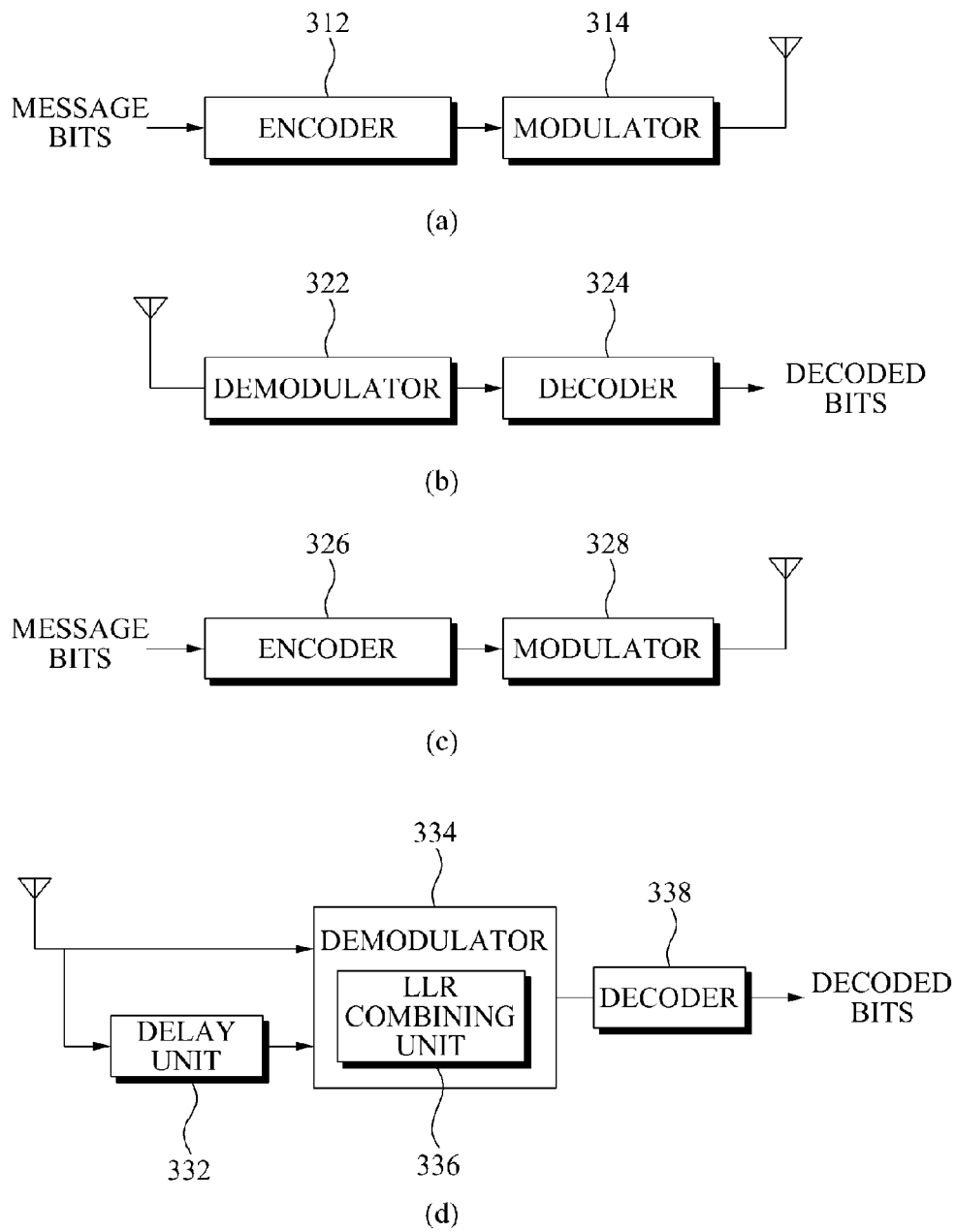
FIG. 3 illustrates configurations of an apparatus providing cooperative reception diversity based on signal point rearrangement in a relay system according to an example embodiment.

FIG. 3 illustrates configurations of an apparatus providing cooperative reception diversity based on signal point rearrangement in a relay system according to an example embodiment.

FIG. 3(*a*) illustrates a transmitting unit in a relay system using the cooperative reception diversity based on signal point rearrangement.

Referring to FIG. 3(*a*), the transmitting unit 110 may include an encoder 312 and modulator 314. A plurality of message bits are channel-encoded through a encoder 312, and the channel-encoded bits are inputted to the modulator 314. The channel-encoded bits are mapped according to a signal point (or symbol) used in a modulation scheme predetermined by the modulator 314 and then outputted. In this instance, the predetermined modulation scheme includes BPSK, Quadrature Phase Shift Keying (QPSK), 16-QAM, and the like.

FIG. 3(*b*) illustrates configurations of a receptor of a relay station in a relay system using the cooperative reception diversity based on signal point rearrangement.

Referring to FIG. 3(*d*), the reception unit 130 may include a delay unit 332, a demodulator 334, a Log-Likelihood Ratio (LLR) combining unit 336, and decoder 338. The reception unit 130 may receive signal through two phases. In other words, the reception unit receives a signal from the transmitting unit 110 and a signal from the relay station 120. In light of time order, the reception unit 130 first receives the signal from the transmitting unit and thus the reception unit 130 may calculate an LLR of the symbol received from the transmitting unit 110 through the LLR combining unit 336 as given in Equation 3. In this instance, the delay unit 332 is given to express a time delay.

FIG. 3(*c*) illustrates configurations of a transmitter of a relay station in a relay system using the cooperative reception diversity based on signal point rearrangement.

Referring to FIG. 3(*c*), the transmitting unit of the relay station 120 includes an encoder 326 and modulator 328. The relay station 120 may perform channel-encoding again using the plurality of message bits decoded in FIG. 3(*b*). An output of the channel-encoding is inputted to the modulator 328. In this instance, the modulator 328 of the relay station 120 use a mapper that uses a different mapping scheme from a mapping scheme between symbol and bit used in the transmitting unit 110. That is, a signal is mapped with a signal point different from that of the transmitting unit 110.

As described above, the mapping scheme used in the transmitting unit 110 and the mapping scheme used in the relay station 120 are changed, and thus an average error rate of bits within a symbol in a reception unit 130 is decreased.

FIG. 3(*d*) illustrates configurations of a reception unit in a relay system using the cooperative reception diversity based on signal point rearrangement.

Referring to FIG. 3(*d*), the reception unit 130 may include a delay unit 332, a decoder 334, a Log-Likelihood Ratio (LLR) combining unit 336, and decoder 338. The reception unit 130 may receive signal through two phases. In other words, the reception unit receives a signal from the transmitting unit 110 and a signal from the relay station 120. In light of time order, the reception unit 130 first receives the signal from the transmitting unit and thus the reception unit 130 may calculate an LLR of the symbol received from the transmitting unit 110 through the LLR combining unit 336 as given in Equation 3. In this instance, the delay unit 332 is given to express a time delay.

$$LLR = \log_2\left\{\frac{\sum_{x \in S_k^1} p(y|x)}{\sum_{x \in S_k^0} p(y|x)}\right\}$$ [Equation 3]

where the x indicates a transmitted symbol and y indicates a received symbol. The $$S_k^T$$

indicates a symbol x set which satisfies that a $k^{th}$ bit is $$T \in \{0,1\}$$

The $$p(\cdot)$$

indicates a probability density function. That is, the $$p(y|x)$$

is a likelihood function, which indicates a probability density of event y, when the transmitted x is given.

Subsequently, the reception unit 130 calculates the LLR of the symbol received from the relay station 120 through the LLR combination unit 336 using the Equation 3. The LLR combining unit 336 sums each calculated LLR to combine and provide the combined LLR to a decoder 338. The decoder 338 outputs a plurality of message bits using the combined LLR.

Figure 4:
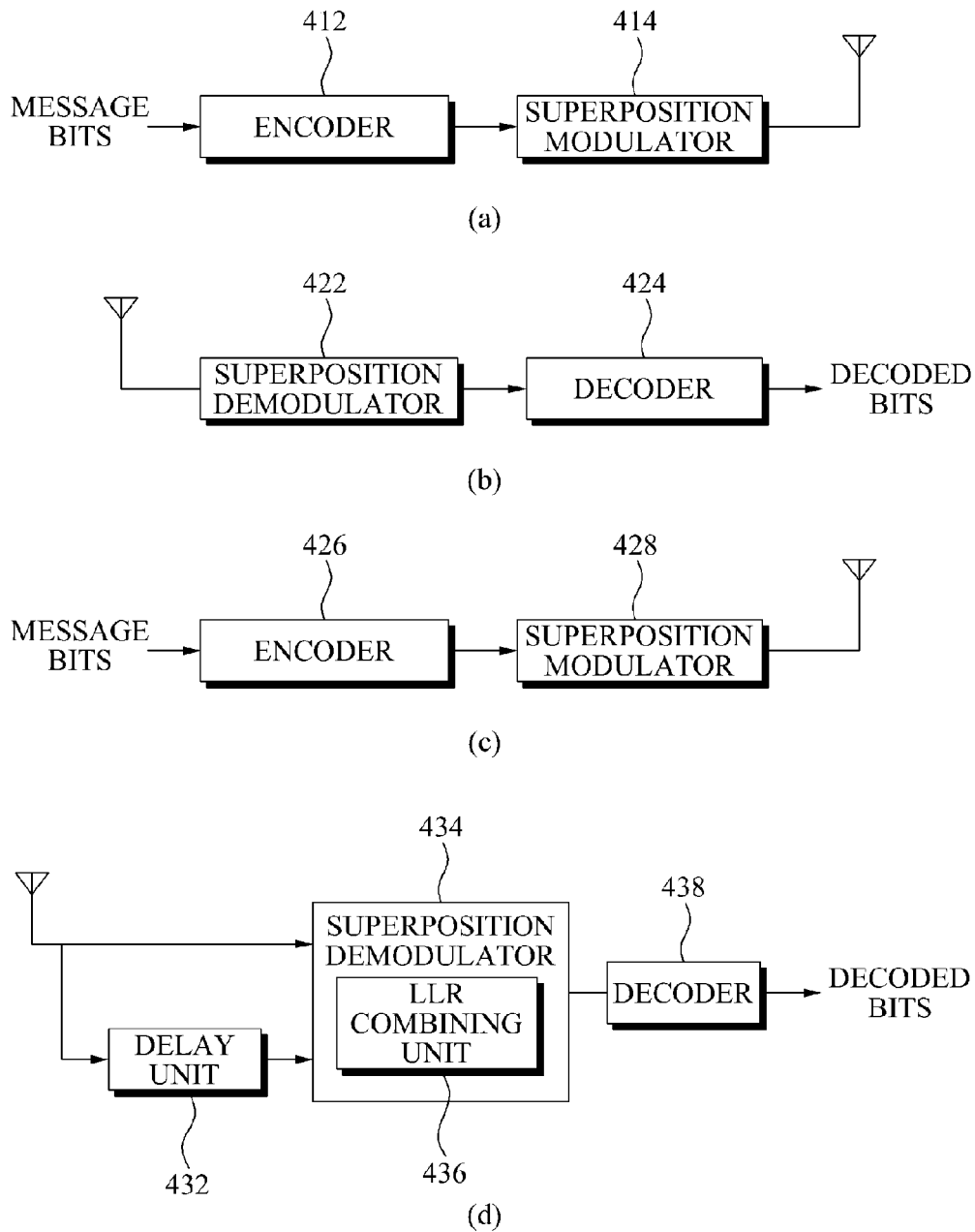
FIG. 4 illustrates configurations of an apparatus providing cooperative reception diversity based on superposition modulation in a relay system according to an example embodiment.

FIG. 4 illustrates configurations of an apparatus providing cooperative reception diversity based on superposition modulation in a relay system according to an example embodiment.

FIG. 4(*a*) illustrates a transmitting unit in a relay system using cooperative reception diversity based on superposition modulation according to an example embodiment of the present invention.

Referring to FIG. 4(a), the transmitting unit 210 may include an encoder 412 and superposition modulator 414. A plurality of message bits is encoded through the encoder (412). A modulation scheme of the superposition modulator 414 can be classified depending on a type of a modulation scheme to be superpositioned, such as superpositioning of BPSK and BPSK, superpositioning of BPSK and QPSK, superpositioning of QPSK and QPSK, superpositioning of QPSK and 16-QAM, superpositioning of 16-QAM and 16-QAM, and the like. FIG. 2 shows the case of superpositioning of the BPSK and BPSK. The superposition modulation unit 414 cuts an output of the encoder 412 by two bits to map the same to each signal point.

FIG. 4(b) illustrates a receptor of a relay station in a relay system using cooperative reception diversity based on superposition modulation according to an example embodiment of the present invention.

Referring to FIG. 4(b), the receptor of the relay station 220 may include a superposition demodulator 422 and decoder 424. A plurality of symbols transmitted from transmitting unit 210 pass through a reception antenna of the relay station 220 and are inputted to the superposition demodulator 422. Outputs demodulated from a superposition demodulator 322 are inputted to the decoder 424 and pass through the decoder 424 to output a plurality of message bits.

FIG. 4(c) illustrates a configuration of a transmitter of a relay station in the relay system using cooperative reception diversity based on superposition modulation according to an example embodiment of the present invention.

Referring to FIG. 4(c), the transmitter of the relay station 220 may include an encoder 426 and superposition modulator 428. The transmitter of the relay station 220 performs channel-encoding again using the plurality of message bits decoded in FIG. 4(b). An output of the channel-encoding is inputted to the superposition modulator 428. In this instance, the superposition modulator 428 of the relay station 220 performs superposition modulation using different superposition modulation from superposition modulation used in the transmitting unit 210. For example, Equations 1 and 2 exchanges symbols and performs superposition modulation.

FIG. 4(d) illustrates a configuration of reception unit in a relay system using cooperative reception diversity based on superposition modulation according to an example embodiment of the present invention.

Referring to FIG. 4(d), the reception unit 230 may include a delay unit 432, superposition modulator 434, LLR combining unit 436, and decoder 438. The reception unit 230 may receive signals from a transmitting unit 210 and relay station 220. Then, the LLR combining unit 436 respectively calculates LLR of symbols received from the transmitting unit 210 and relay station 220 using Equation 3 and sums and combines each of calculated LLR. Subsequently, the LLR combining unit 436 provides the combined LLR to a decoder 338. The decoder 338 may output a plurality of message bits using the combined LLR.

Hereinafter, a method according to the present invention configured as described above is described referring to drawings.

Figure 5:
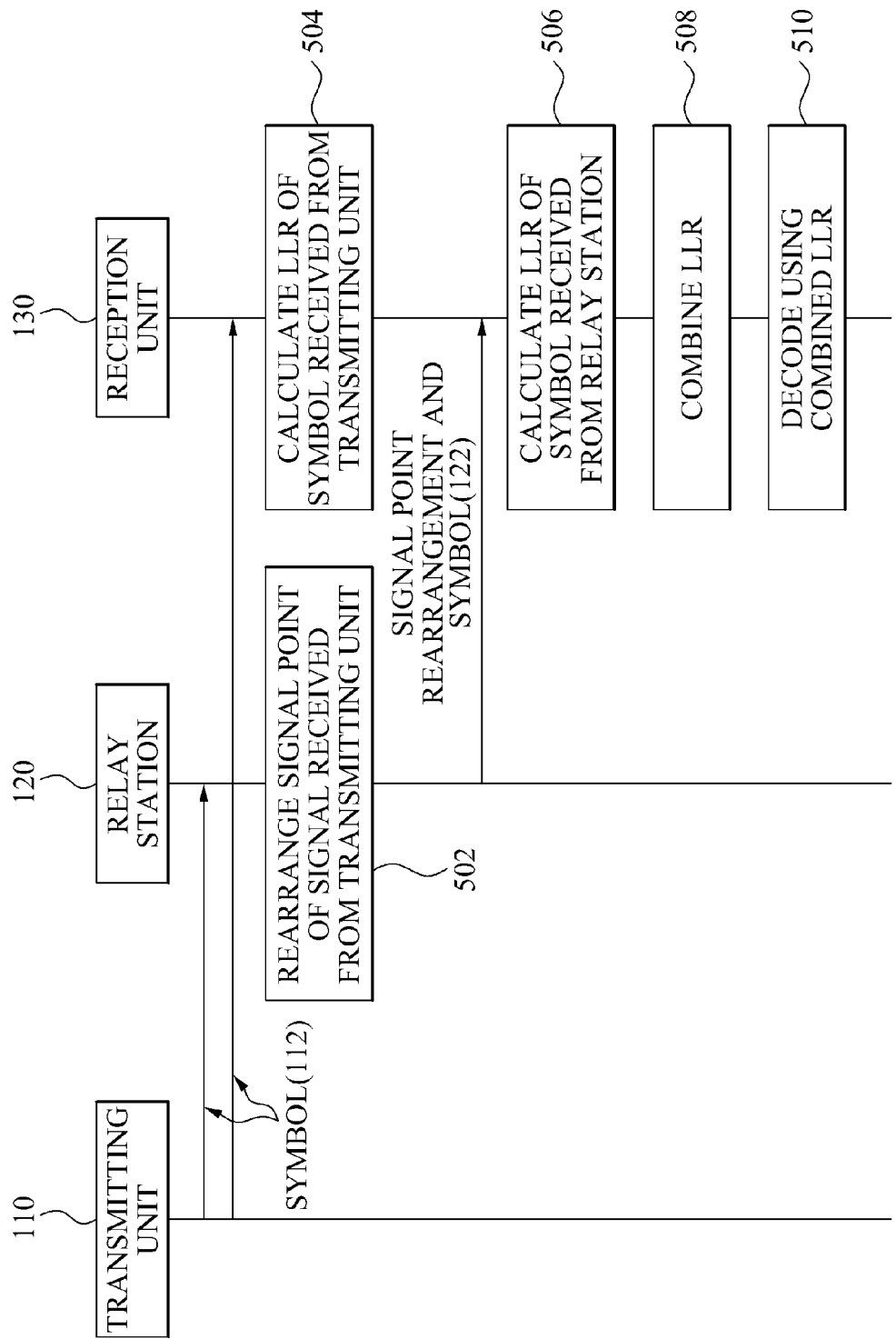
FIG. 5 is a flowchart illustrating a method for cooperative reception diversity based on signal point rearrangement in a relay system according to an example embodiment.

FIG. 5 is a flowchart illustrating a method for cooperative reception diversity based on signal point rearrangement in a relay system according to an example embodiment.

Referring to FIG. 5, a transmitting unit 110 in the relay system of the present invention transmits a symbol 112 mapped with a certain signal point constellation to both relay station 120 and reception unit 130.

Then, in operation 502, the relay station 120 performs demodulation and decoding of the received symbol 112, performs signal point rearrangement with a different signal point constellation from that of the transmitting unit, and transmits a symbol 122 with the rearranged signal point to the reception unit 130.

When the symbol 112 is received from the transmitting unit 110, the reception unit 130 calculates and stores LLR of the received symbol 112 in operation 503. Subsequently, when the symbol 122 with rearranged signal point is received from the relay station 120, the reception unit 130 calculates an LLR of the symbol 122 with rearranged signal point.

In operation 508, the reception unit 130 sums and combines an LLR of each symbol respectively calculated in operations 504 and 506 and in operation 510, the reception unit 130 demodulates the received symbol and decodes the received symbol using the combined LLR.

Figure 6:
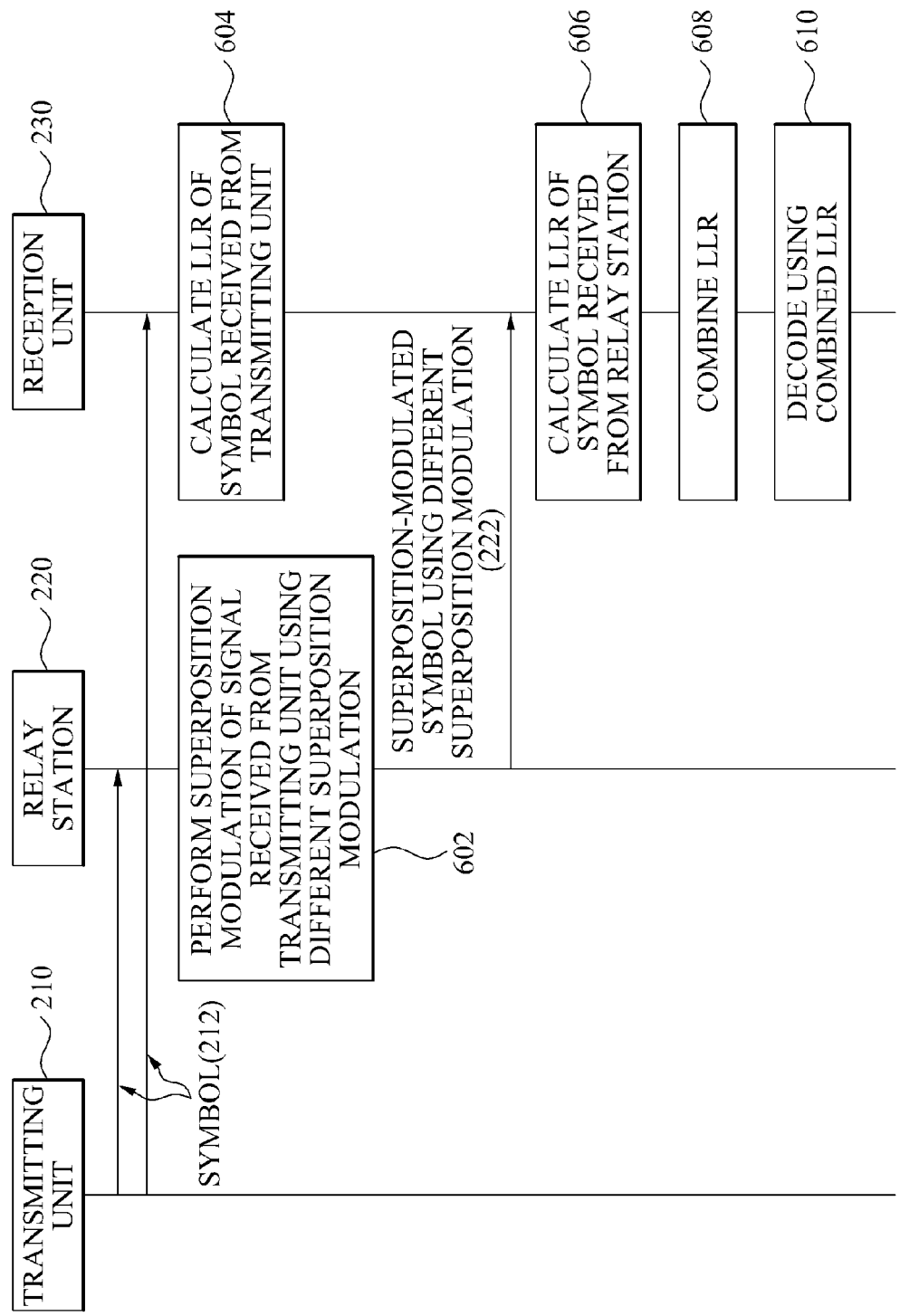
FIG. 6 is a flowchart illustrating a method for cooperative reception diversity based on superposition modulation in a relay system according to an example embodiment.

FIG. 6 is a flowchart illustrating a method for cooperative reception diversity based on superposition modulation in a relay system according to an example embodiment.

Referring to FIG. 6, a transmitting unit 210 in the relay system of the present invention transmits a certain superposition-modulated symbol 212 to a relay station 220 and reception unit 230.

Then, in operation 602, the relay station 220 performs demodulation and decoding of the received symbol 212, modulates using superposition modulation different from that of the transmitting unit 210, and transmits the modulated symbol 222 using the different superposition modulation to the reception unit 230.

When the symbol 212 is received from the transmitting unit 210, the reception unit 230 calculates and stores LLR of the received symbol 212 in operation 604. Subsequently, when the modulated symbol 222 using the different superposition modulation is received from the relay station 220, the reception unit 230 calculates an LLR of the symbol 222.

In operation 608, the reception unit 230 sums and combines an LLR of a symbol respectively calculated in operations 604 and 606 and in operation 610, the reception unit 230 demodulates the received symbol and decodes the received symbol using the combined LLR.

The present invention and a conventional art are compared with respect to performance referring to drawings below.

Figure 7:
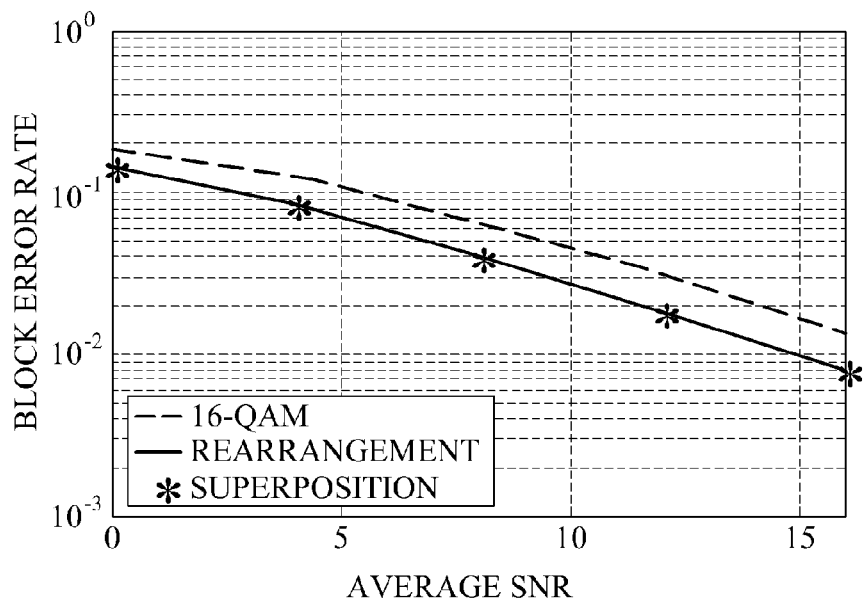
FIG. 7 is a graph comparing a cooperative reception diversity method which does not use signal point rearrangement, a cooperative reception diversity method based on signal point rearrangement, and a cooperative reception diversity method based on superposition modulation, with respect to a block error rate at a symmetric channel.

FIG. 7 is a graph comparing a cooperative reception diversity method which does not use signal point rearrangement, a cooperative reception diversity method based on signal point rearrangement, and a cooperative reception diversity method based on superposition modulation, with respect to a block error rate at a symmetric channel. In this instance, the symmetric channel indicates that an average Signal-to-Noise Ratio (SNR) of a channel between a transmitting unit and a reception unit and an average SNR of a channel between a relay station and reception unit are equal. A transmission of four bits is performed for each symbol. That is, the cooperative reception diversity method which does not use signal point rearrangement and the cooperative reception diversity method based on signal point rearrangement may use 16-QAM, and QPSK and QPSK are superpositioned in the cooperative reception diversity method based on superposition modulation.

Also, it is assumed that a channel between the transmitting unit and the relay station is ideal. In other words, every symbol that the transmitting unit transmits to the relay station is detected in the relay station without error. In this case, it is assumed that a size of a block is 1,024 bits, and a condition is under a block Rayleigh fading. Also, a channel-encoding scheme uses a turbo code and when performing a decoding in the process of turbo-encoding, an iteration number is limited to four. A coding rate is ⅓. A power division coefficient is defined as 0.2 (α=0.2) in cooperative reception diversity based on superposition modulation.

When the cooperative reception diversity method based on superposition modulation uses the defined power division coefficient α(α=0.2), it shows the same performance to the cooperative reception diversity method based on signal point rearrangement. Also, compared with the cooperative reception diversity method which does not use signal point rearrangement, the performance is improved by about 2 dB in overall SNR range.

Figure 8:
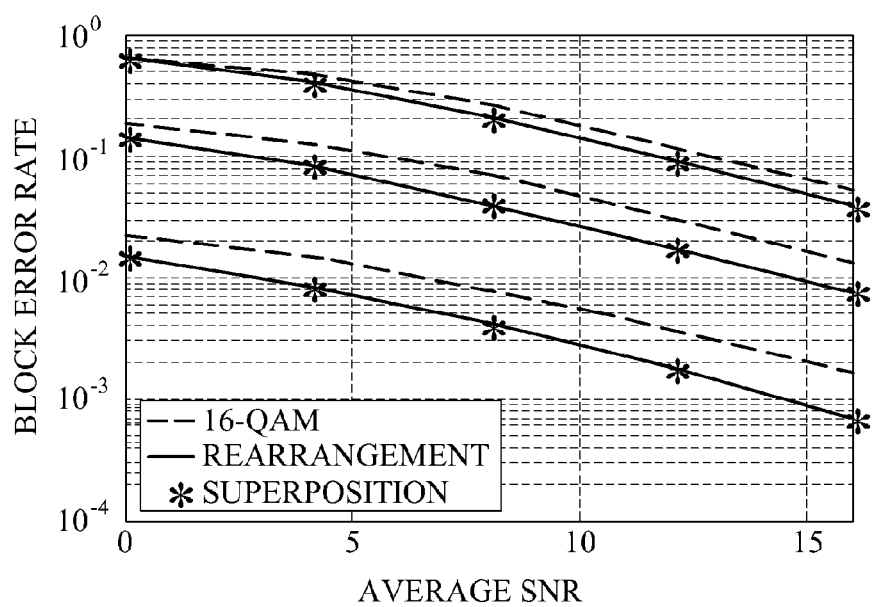
FIG. 8 is a graph comparing a cooperative reception diversity method which does not use signal point rearrangement, a cooperative reception diversity method based on signal point rearrangement, and a cooperative reception diversity method based on superposition modulation, with respect to a block error rate at an asymmetric channel.

FIG. 8 is a graph comparing a cooperative reception diversity method which does not use signal point rearrangement, a cooperative reception diversity method based on signal point rearrangement, and a cooperative reception diversity method based on superposition modulation, with respect to a block error rate at an asymmetric channel. In this instance, the asymmetric channel indicates that an average SNR of a channel between a transmitting unit and a reception unit and an average SNR of a channel between a relay station and reception unit are different from each other. A transmission of four bits is performed for each symbol. That is, the cooperative reception diversity method which does not use signal point rearrangement and the cooperative reception diversity method based on signal point rearrangement may use 16-QAM, and QPSK and QPSK are superpositioned in the cooperative reception diversity method based on superposition modulation. Also, it is assumed that a channel between the transmitting unit and the relay station is ideal. The graph shows a comparison of performance of a block error rate according to the average SNR of the channel between the transmitting unit and reception unit under a condition that the average SNR of the channel between the relay station and reception channel is respectively fixed to 0 dB, 10 dB, and 20 dB. In other words, every symbol that the transmitting unit transmits to the relay station is detected in the relay station without any error. In this case, it is assumed that a size of a block is 1,024 bits, and a condition is under a block Rayleigh fading. Also, a channel-encoding scheme uses a turbo code and when performing a decoding in the process of turbo-encoding, an iteration number is limited to four. A coding rate is ⅓. A power division coefficient is defined as 0.2 (α=0.2) in cooperative reception diversity based on superposition modulation.

Accordingly, it is known that the cooperative reception diversity method based on signal point rearrangement shows the same performance to the cooperative reception diversity based on superposition modulation. Also, as an average SNR of a transmitting unit-R link is improved from 0 dB to 10 dB and to 20 dB, the performance is improved, compared with the cooperative reception diversity method which does not use signal point rearrangement. In the case that a target BLER is set to $10^{-2}$, when an average SNR of a link between the transmitting unit and relay station is guaranteed to be 20 dB, the cooperative reception diversity method based on either signal point rearrangement or superposition modulation can obtain about 3 dB of SNR gain compared with the cooperative reception diversity method which does not use signal point rearrangement.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A computing device-implemented method for cooperative reception diversity based on superposition modulation in a relay station of a relay system, comprising:
    receiving a superposition-modulated symbol from a transmitting unit, the symbol modulated with a first type of superposition modulation;
    demodulating the received symbol and decoding the demodulated symbol to output a message bit; and
    modulating at the relay station the message bit using a type of superposition modulation different from the first type of superposition modulation used in the transmitting unit, and relaying the modulated message bit to a reception unit.

2. The method of claim 1, wherein the superposition modulation different from the superposition modulation used in the transmitting unit performs superposition modulation by exchanging and assigning power ratio between symbols, the power ratio being assigned to each symbol from the transmitting unit.

3. A computing device-implemented method for cooperative reception diversity based on superposition modulation in a reception unit of a relay system, comprising:
    calculating a Log-Likelihood Ratio (LLR) of the symbol when a certain superposition-modulated symbol is received from a transmitting unit, the symbol modulated with a first type of superposition modulation;
    calculating an LLR of a symbol modulated at the relay station using a different type of superposition modulation from the first type of superposition modulation used in the transmitting unit when the symbol modulated using the different superposition modulation is received from a relay station; and
    summing and combining an LLR of each symbol received through the transmitting unit and relay station.

4. The method of claim 3, further comprising:
    decoding the symbol received through the relay station using the combined LLR.

5. A computing device-implemented method for cooperative reception diversity based on signal point rearrangement in a relay station of a relay system, comprising:
    receiving a symbol mapped with a certain signal point constellation from a transmitting unit;
    demodulating the received symbol and decoding the demodulated symbol to output a message bit; and
    rearranging the signal point of the message bit at the relay station to be different than the signal point constellation arranged in the transmitting unit and relaying to a reception unit.

6. A computing device-implemented method for cooperative reception diversity based on signal point rearrangement in a reception unit of a relay system, comprising:
    calculating a Log-Likelihood Ratio (LLR) of the symbol when a symbol mapped with a certain signal point constellation is received from a transmitting unit;
    calculating an LLR of a symbol with rearranged signal point when the symbol with the rearranged signal point is received from a relay station, the rearranged signal point rearranged at the relay station; and
    summing and combining an LLR of each symbol received through the transmitting unit and relay station.

7. The method of claim 6, further comprising:
    decoding the symbol received through the relay station using the combined LLR.

8. A relay station in a relay system for providing cooperative reception diversity, comprising:
- a demodulator to demodulate a certain superposition-modulated symbol when the certain superposition-modulated symbol is received from a transmitting unit;
- a decoder to decode the symbol demodulated through the demodulator, to output a message bit;
- an encoder to perform channel-encoding of the message bit; and
- a modulator to modulate the encoded message bit using a type of superposition modulation different from a first type of superposition modulation used in the transmitting unit.

9. The relay station of claim 8, wherein, when the demodulator receives a symbol mapped with a certain signal point constellation from the transmitting unit, the modulator rearranges the signal point of the message bit unlike the signal point constellation arranged in the transmitting unit to modulate the message bit.

10. The relay station of claim 8, wherein the modulator modulates using superposition modulation different from the superposition modulation used in the transmitting unit by exchanging and assigning a power ratio between symbols, the power ratio being assigned to each symbol from the transmitting unit.

* * * * *